UNITED STATES PATENT OFFICE.

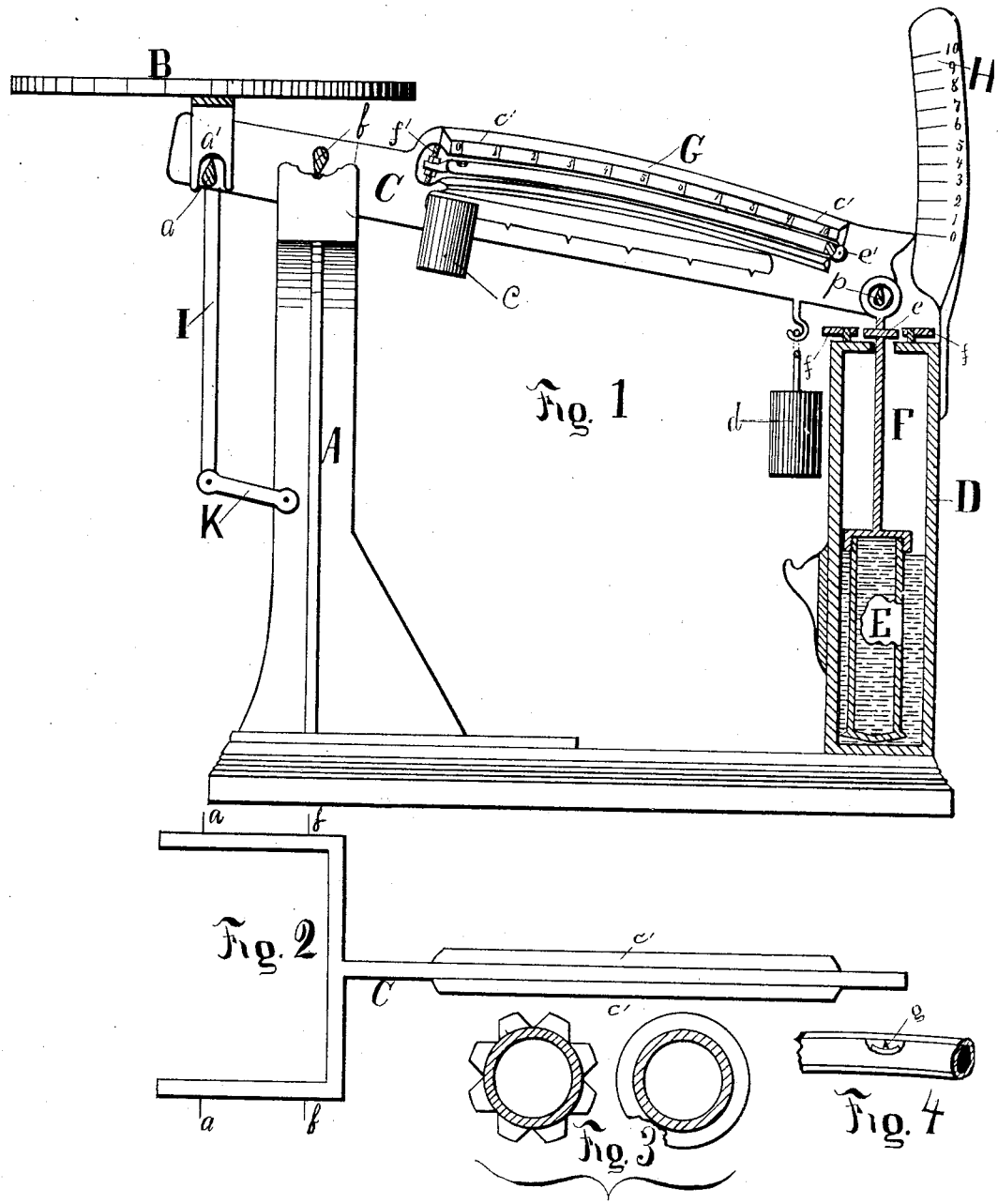

FRANK D. PAYN, OF ALBANY, NEW YORK.

AUTOMATIC WEIGHING-SCALE.

SPECIFICATION forming part of Letters Patent No. 254,502, dated March 7, 1882.

Application filed May 26, 1881. (No model.)

*To all whom it may concern:*

Be it known that I, FRANK D. PAYN, of the city and county of Albany, State of New York, have invented certain new and useful Improvements in Weighing-Scales; and I do hereby declare that the following is a full, clear, and exact description of the same, reference being had to the accompanying drawings, in which—

Figure 1 is a front elevation of the machine with certain of the parts in section. Fig. 2 is a plan view of the scale beam or arm detached. Fig. 3 illustrates the flange or rim at the base of the plunger-cup, and Fig. 4 shows the index rider or pointer within the graduated measuring-tube.

The object of the invention is to furnish a simple, compact, and accurate means for ascertaining the weight of articles; and to that end the invention consists of certain improvements in the structure of that class of weighing-scales which automatically or by self-adjustment indicate the weight of the body tested, said improvements being more particularly described hereinafter, and distinctly pointed out in the claims.

An upright standard, A, rises vertically from the base, to which it is firmly secured, and is branched or bifurcated in U form—like the ordinary tuning-fork—to receive upon the upper face of each of said branches the knife-edge support or fulcrum $b$, projecting from the outer side of the forked arms of the scale-beam C, Fig. 2. The scale-beam C has in addition a second set of knife-edge supports, which project, like the former, from the outer side of the forked arms of said beam. These supports $a$ $a$ serve to sustain the scale platform or pan B, which has secured to its under side and at opposite points two depending lugs, $a'$ $a'$, that rest upon the knife-edge supports $a$ $a$, and so maintain the pan in place. A link, I, secured by pivot-joint centrally beneath the pan B, and at its opposite end to a short arm, K, projecting from the standard A by like pivot-connections, serves to steady the pan and to keep the knife-edge lines of contact of scale-beam pan and standard in exact alignment, and thus provides for the sensitive and accurate movement of the several parts, as well understood in the art.

Along the face of the lever-arm or scale-beam C two longitudinal slots, one above the other, are made, the upper slot being slightly curved in allowance for the radial movement of the beam about its fulcrum $b$ $b$, for a purpose hereinafter set forth. In said upper slot a slightly-curved tube of glass, G, is arranged, and in this instance is protected from danger of breakage by flanges $c'$ $c'$ on the beam-face C, which project from and over the upper edge of the slot, in the manner of a roof or shield. The tube G is filled with mercury or other liquid, saving an air or bubble space, usually met with in leveling-tubes, and in said bubble-space a disk of metal with needle-point projection, Fig. 4, or, if other liquid than mercury be used, a float-disk of sassafras-pith or the like, is placed, which said disk or float shifts with the bubble, and by its index-needle ascertains with accuracy the exact point or line of subdivision on the graduated scale (marked on the tube or on the beam above the tube) that is central to the bubble. The ends of the graduated tube G are cemented into metal cups or sockets, which have flattened fins projecting from their bases. These fins serve, the first, by pin-joint, to pivot the cup, and consequently the tube seated in the cup, to the scale-beam, (see $e'$,) and the second to receive through a central eye or perforation a short screw-shaft, $f'$, seated at its ends in the scale-beam, and bearing above and below the flattened flange a set-nut, by means of which any accidental displacement of the tube-level, as indicated by the bubble, may be remedied.

If desired, the tube G may be located above the scale-beam, as shown in my former patent, No. 213,062, March 11, 1879, or it may be set in a frame separate from the beam and be pivoted thereto; but the construction defined herein seems least liable to disturb the equipoise of the parts or to expose the tube to fracture.

It will be apparent that the slight curvature given to the upper slot, and as well to the tube G retained therein, allows for a more accurate adjustment and reading of the bubble and float than would otherwise be possible in determining the level point of a scale-beam moving radially about the fulcrum $b$. The lower longitudinal slot of the scale-beam admits a counterpoise weight or rider c, which may be used to balance a bucket, cask, bottle, or other tare weight resting upon the scale-pan, though to simplify structure this additional slot and adjuncts may be dispensed with.

At the forward end of the scale-beam, and resting on the usual knife-edge projection or suspension-point $p$, depends a rod or stem, F, which at its lower end expands into a flange or rim threaded on its interior, and serving as a retention cap or cover to the plunger-cup E. The plunger-cup E may have a projecting rim at its base, either continuous or cut in scallop-like form, (see Fig. 3,) or it may be without any such extended flange. The said cup and its suspending-stem are contained within a vertical jar or dash-pot, D, secured rigidly to the base of the machine, and of capacity necessary for the purpose presently to be set forth. The plunger-cup E being filled with mercury and arranged in position, as shown, a quantity of the same liquid metal is poured into the outer vessel or dash-pot, D, just sufficient to buoy the plunger-cup, and so to maintain the beam and scale-pan in zero equilibrium. When this point of buoyancy is reached it must be apparent that any substance placed upon the scale-pan will tend to depress the same, to elevate the beam, and to lift the plunger-cup from out of the mercury bath in which it is submerged, thus removing said cup from the buoyant influence of the bath and making it more and more a dead weight to counterpoise the article on the pan. This tendency will continue until finally the parts are in equilibrium, when the weight will be determined by the position of the float pointed in the measuring-tube, or else by that of the finger on the end of the scale-beam, which traverses the graduated scale H, said scale being secured to the dash-pot and suitably marked by radial lines running from the fulcrum $b$ as a center. Any other liquid may be used in lieu of mercury in the dash-pot or plunger-cup—such, for example, as glycerine, the oils, water, &c.—but not with same advantages or with as accurate results as attend upon its use. Being of high density, the mercury permits of compactness in structure of machine, and causes the scale-beam to come to rest and at poise more quickly than the less dense liquids acting as resisting media to the plunger can accomplish. It is influenced in volume much less than these at ordinary temperatures, vaporizes well-nigh unappreciably, and does not adhere to the sides of the plunger in its to-and-fro movement. For these reasons mercury is preferred, particularly for the bath in the dash-pot, though, as heretofore stated, no essential difference in principle is involved in the substitution of other liquids therefor. The cup-plunger may be dispensed with and a solid bar of metal or like heavy material be employed instead. Both cup and pot may be made of gutta-percha to lessen conductivity, though for cheapness these parts are of iron or of carbon coated brass, the coating designed to resist the attack of the mercury.

A bob or poise, $d$, may be suspended from a hook near the forward end of the beam C when the weight of the article on the scale-pan is in excess of the compass of the measuring tube or scale.

Near the upper end of the stem F a disk or flange, $e$, is secured, which may be faced with felt or other like packing material. When the scales are to be transported the stem is forced down until the said flange $e$ is seated snugly against the top of the pot D, whereupon the turn-buttons $f f$ are brought in place over the flange, thus securing the beam from movement and the mercury or other liquid in the pot from escape.

For protection of the parts, and to give an ornamental finish, a case may inclose the standard and dash-pot, and for greater compactness the stem F, with its attendant parts, may be located nearer the fulcrum $b$ of the beam than is shown in the extreme position of the drawings.

By merely enlarging the parts the same plan of structure herein detailed may be adapted to use as a platform or other heavy-weight scale with like success, as in an ordinary counter-scale.

Automatic weighing-scales having a plunger and submerging-vessel to act in counterpoise of the load upon the scale-pan have heretofore been used; but in such instances the plunger and pan are suspended at opposite ends of a flexible strap which requires a revolving wheel or drum to sustain it in operation, whereas in my device the function of these two parts—viz., the flexible strap and revolving drum—is performed by a single element—the pivoted beam—whereby the number of parts in combination is reduced, and the first cost of construction and liability to error is considerably diminished. The significance of this difference in structure must be apparent when it is remembered that the scale-beam in my device is much the same as that found in the ordinary counter-scale, so that my improvements may be adapted thereto very readily. No such adaptation is possible in the old form of automatic scale referred to, involving the use of a flexible strap and a sustaining-drum.

In my former patent, No. 213,062, issued March 11, 1879, a graduated level tube is pivoted to the scale-beam, after the manner of my present device; but said tube is located above the beam, instead of within a slot in the beam, and is thus exposed to chance of fracture—a risk which my present invention is designed to avoid.

Having thus described my invention, what I claim, and desire to secure by Letters Patent, is—

1. In an automatic or self-adjusting weighing-scale, the combination, with a pivoted beam or arm, of a scale-pan and an equipoise-plunger, substantially as described.

2. In an automatic weighing-scale, the combination, with a pivoted beam or arm, of a scale-pan, an equipoise-plunger, and a dash-pot, substantially as set forth.

3. In a weighing-scale, the combination of the beam C with the stem F, the cup E, and the dash-pot D, substantially as herein described.

4. The combination, in a weighing-scale, of the beam C, the stem F, having disk $e$, and the dash-pot D, provided with turn-buttons $f f$, substantially as described.

5. In a weighing-scale, the combination, with a slotted beam or arm, of a measuring-tube set therein, substantially as described.

6. In a weighing-scale, the combination, with a slotted beam or arm provided with projecting flanges, of a measuring-tube set in said slot and protected by said flanges, substantially as set forth.

7. In a weighing-scale, the combination, with the measuring-tube, of an index float or pointer which shifts with each change in poise of the beam, substantially as herein described.

FRANK D. PAYN.

Witnesses:
J. G. RUNKLE,
JAMES H. PEIRCE.